(12) United States Patent
Hirano

(10) Patent No.: US 9,100,081 B2
(45) Date of Patent: Aug. 4, 2015

(54) RADIO RECEPTION DEVICE FOR VEHICLE AND NOISE CANCELLATION METHOD

(75) Inventor: Takayuki Hirano, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 326 days.

(21) Appl. No.: 13/635,807

(22) PCT Filed: Mar. 16, 2011

(86) PCT No.: PCT/JP2011/001546
§ 371 (c)(1),
(2), (4) Date: Sep. 18, 2012

(87) PCT Pub. No.: WO2011/114726
PCT Pub. Date: Sep. 22, 2011

(65) Prior Publication Data
US 2013/0010977 A1 Jan. 10, 2013

(30) Foreign Application Priority Data
Mar. 18, 2010 (JP) ................................. 2010-062358

(51) Int. Cl.
*G10K 11/16* (2006.01)
*H03B 29/00* (2006.01)
*H04B 1/10* (2006.01)
*H04B 1/12* (2006.01)
*H04B 15/00* (2006.01)

(52) U.S. Cl.
CPC .............. *H04B 1/126* (2013.01); *H04B 15/005* (2013.01)

(58) Field of Classification Search
None
See application file for complete search history.

(56) References Cited

U.S. PATENT DOCUMENTS

| 4,736,455 | A | 4/1988 | Matsue et al. | |
| 2003/0202669 | A1* | 10/2003 | Boor | 381/111 |
| 2010/0239101 | A1* | 9/2010 | Okamura et al. | 381/71.1 |

FOREIGN PATENT DOCUMENTS

| EP | 1871011 A1 | 12/2007 |
| JP | 62-147818 A | 7/1987 |
| JP | 3-238929 A | 10/1991 |
| JP | 6-52238 | 7/1994 |
| JP | 2010-4451 A | 1/2010 |
| WO | WO2006/112280 A1 | 10/2006 |
| WO | PCT/JP2011/001546 | 5/2011 |

OTHER PUBLICATIONS

Notification of Transmittal of Translation of the International Preliminary Report on Patentability for Application No. PCT/JP2011/001546, mailed Nov. 1, 2012.
Yutaka Matsumoto et al., Integrated Circuit (IC) for Multi Function Tuner, Fujitsu Ten Technical Journal, No. 33, Apr. 1998, pp. 12-22, Fujitsu Ten Technology Report/vol. 17 No. 1, Japan.
Japanese Office Action for Application No. 2012-505511 issued Nov. 11, 2014.

* cited by examiner

*Primary Examiner* — Regina N Holder
(74) *Attorney, Agent, or Firm* — RatnerPrestia

(57) ABSTRACT

A radio reception device for vehicle 100 (200) includes a variable phase shifter 22, an amplitude regulator 23, and an adder 24, and has an arrangement in which a signal of an RF, IF, or baseband stage of a radio receiver mixed with a noise is added to a phase-inverted component of the noise to remove only the noise. Therefore, sound distortion due to loss of sound information does not occur so that a quality sound can be provided.

10 Claims, 6 Drawing Sheets

RADIO RECEPTION DEVICE FOR VEHICLE AND NOISE CANCELLATION METHOD

This application is a U.S. National Phase Application of PCT International Application PCT/JP2011/001546.

TECHNICAL FIELD

The present invention relates to a radio reception device for vehicle with a noise canceling function for removing noises generated from on-board electronics and to a noise cancellation method.

BACKGROUND ART

When noises radiated from electronics on a vehicle enter a radio antenna and interfere with a radio broadcast, the noises are mixed with the radio sound, resulting in sounds that are offensive to the ears and uncomfortable. FIG. 6 illustrates received broadcast waves mixed with noises.

A conventionally known technique for reducing such noises is to include: an analog switching circuit that is supplied, as an input, with a sound signal carrying pulsating noises, is controlled by a control signal to turn on and off, is turned off while the pulsating noises exist, and outputs the sound signal with the pulsating noises being suppressed; and a voltage retaining circuit connected to the analog switching circuit, the voltage retaining circuit retaining, while the analog switching circuit is turned off, a voltage that exists immediately before the circuit is turned off as an interpolating voltage to replace the noises on the sound signal from the analog switching circuit (for example, see Patent Literature 1).

Another known technique is to incorporate an AM noise canceller into a multifunctional tuner IC, focusing on the performance of removing pulsating noises in a weak electric field that are most offensive to the ears during AM radio reception (for example, see Non-Patent Literature 1).

As illustrated in FIG. 5, these conventional techniques cut short-period pulsating noises from an alternator, a windshield wiper and the like that are mixed with radio, and remove the annoying noises by linear interpolation.

CITATION LIST

Patent Literature

Patent Literature 1: Japanese Patent Laid-Open No. 03-238929

Non-Patent Literature

Non Patent Literature 1: Fujitsu Ten Technical Journal, No. 33, April 1999, pp. 12-22

SUMMARY OF INVENTION

Technical Problem

In conventional techniques, however, a lower noise reduction threshold is needed as shown in FIG. 6 in order to obtain a greater noise reduction effect, the problem with which is a side effect that causes loss of more sound information along with noises, generating distortions and clicking noises and degrading the sound quality.

The present invention has been made under such circumstances. It is an object of the invention to provide a noise canceller capable of removing only noises even if the noises are generated without affecting original sound information.

Solution to Problem

A radio reception device according to an aspect of the present invention is connected with an antenna, and includes: an oscillator; a first mixer that outputs a signal generated by mixing an output signal from the oscillator with a broadcast signal received by the antenna; a filter that extracts a noise intruding on the device; a second mixer that outputs a signal generated by mixing the noise extracted by the filter with the output signal from the oscillator; a variable phase shifter that outputs a signal generated by inverting a phase of the signal output from the second mixer by 180 degrees; an amplitude regulator that outputs a signal generated by regulating an amplitude of the signal output from the variable phase shifter; and an adder that outputs a signal generated by adding the signal output from the amplitude regulator to the signal from the first mixer.

As described herein, there are other embodiments of the invention. Therefore, the disclosure of the invention is intended to provide some aspects of the invention and is not intended to limit the scope of the invention as described and claimed herein.

DESCRIPTION OF EMBODIMENTS

Figure 1:
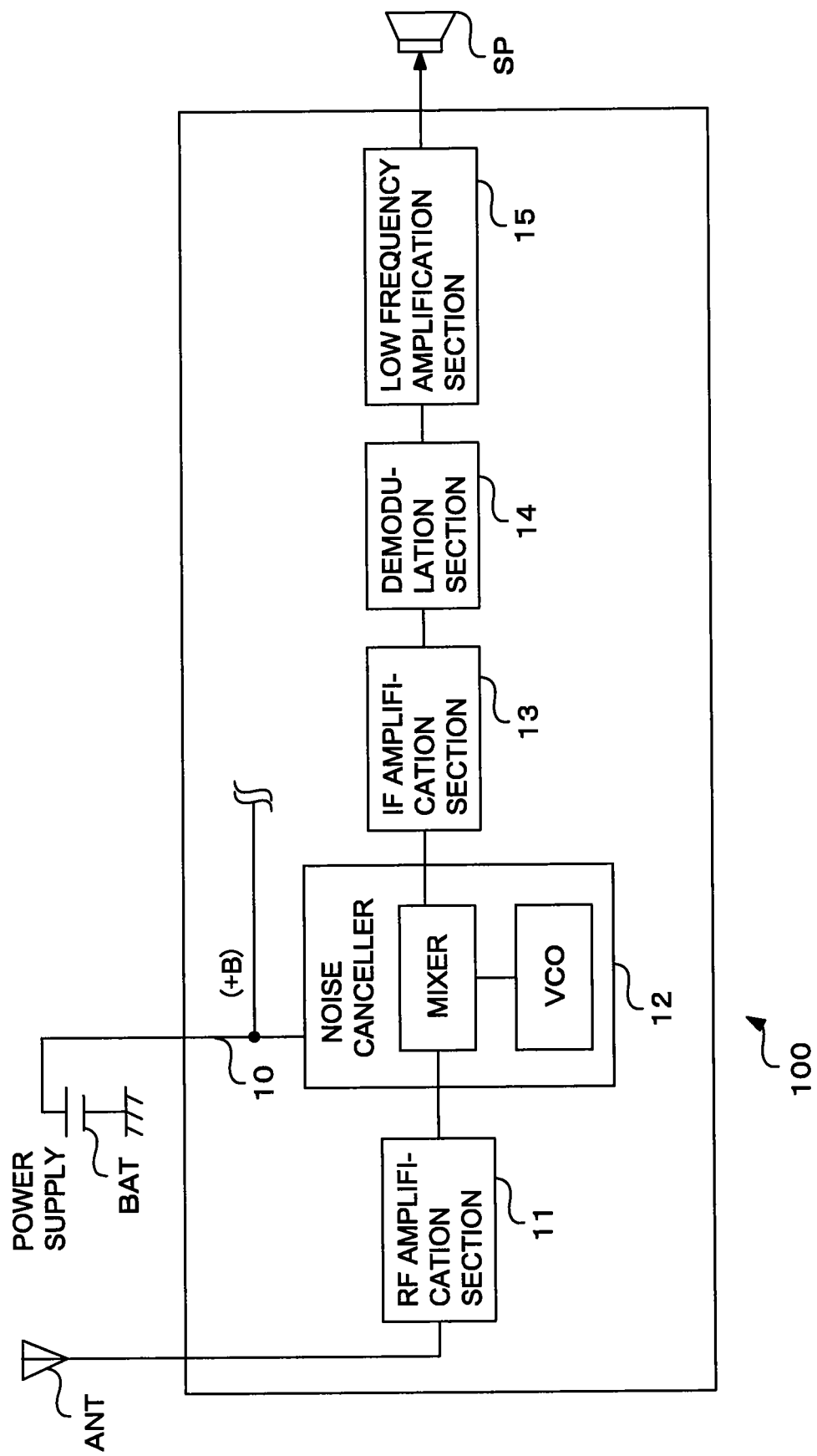
FIG. 1 is a block diagram of a radio reception device for vehicle according to a first embodiment of the invention.

The present invention will now be described in detail. The detailed description below and attached drawings, however, are not intended to limit the present invention.

A radio reception device according to the invention includes: an oscillator; a first mixer that outputs a signal generated by mixing an output signal from the oscillator with a broadcast signal received by the antenna; a filter that extracts a noise intruding on the device; a second mixer that outputs a signal generated by mixing the noise extracted by the filter with the output signal from the oscillator; a variable phase shifter that outputs a signal generated by inverting a phase of the signal output from the second mixer by 180 degrees; an amplitude regulator that outputs a signal generated by regulating an amplitude of the signal output from the variable phase shifter; and an adder that outputs a signal generated by adding the signal output from the amplitude regulator to the signal from the first mixer.

The radio reception device according to the invention includes: a filter that extracts a noise intruding on the device; a variable phase shifter that outputs a signal generated by inverting a phase of the noise extracted by the filter by 180 degrees; an amplitude regulator that outputs a signal generated by regulating an amplitude of the noise output from the variable phase shifter; and an adder that outputs a signal generated by adding a broadcast signal received by an antenna to the signal output from the amplitude regulator.

A noise cancellation method according to the invention includes: outputting, by a first mixer, a signal generated by mixing an output signal from an oscillator with a broadcast signal received by the antenna; extracting, by a filter, a noise intruding on the device; outputting, by a second mixer, a signal generated by mixing the noise extracted by the filter with the output signal from the oscillator; outputting, by a variable phase shifter, a signal generated by inverting a phase of the signal output from the second mixer by 180 degrees; outputting, by an amplitude regulator, a signal generated by regulating an amplitude of the signal output from the variable phase shifter; and outputting, by an adder, a signal generated by adding the signal output from the amplitude regulator to the signal from the first mixer.

The noise cancellation method according to the invention includes: extracting, by a filter, a noise intruding on the device; outputting, by a variable phase shifter, a signal generated by inverting a phase of the noise extracted by the filter by 180 degrees; outputting, by an amplitude regulator, a signal generated by regulating an amplitude of the noise output from the variable phase shifter; and outputting, by an adder, a signal generated by adding a broadcast signal received by the antenna to the signal output from the amplitude regulator.

With such configurations, an adder adds a noise superimposed on received waves to a noise component, the phase of which is inverted by 180 degrees, and thereby it is possible to reduce only noises from broadcast waves.

First Embodiment

A radio reception device for vehicle and a noise cancellation method according to a first embodiment of the invention will now be described with reference to FIGS. 1 and 2. The embodiment adopts an IF-baseband noise reduction scheme, in which a noise superimposed on an IF signal and a baseband signal is subject to the processing.

Figure 2:
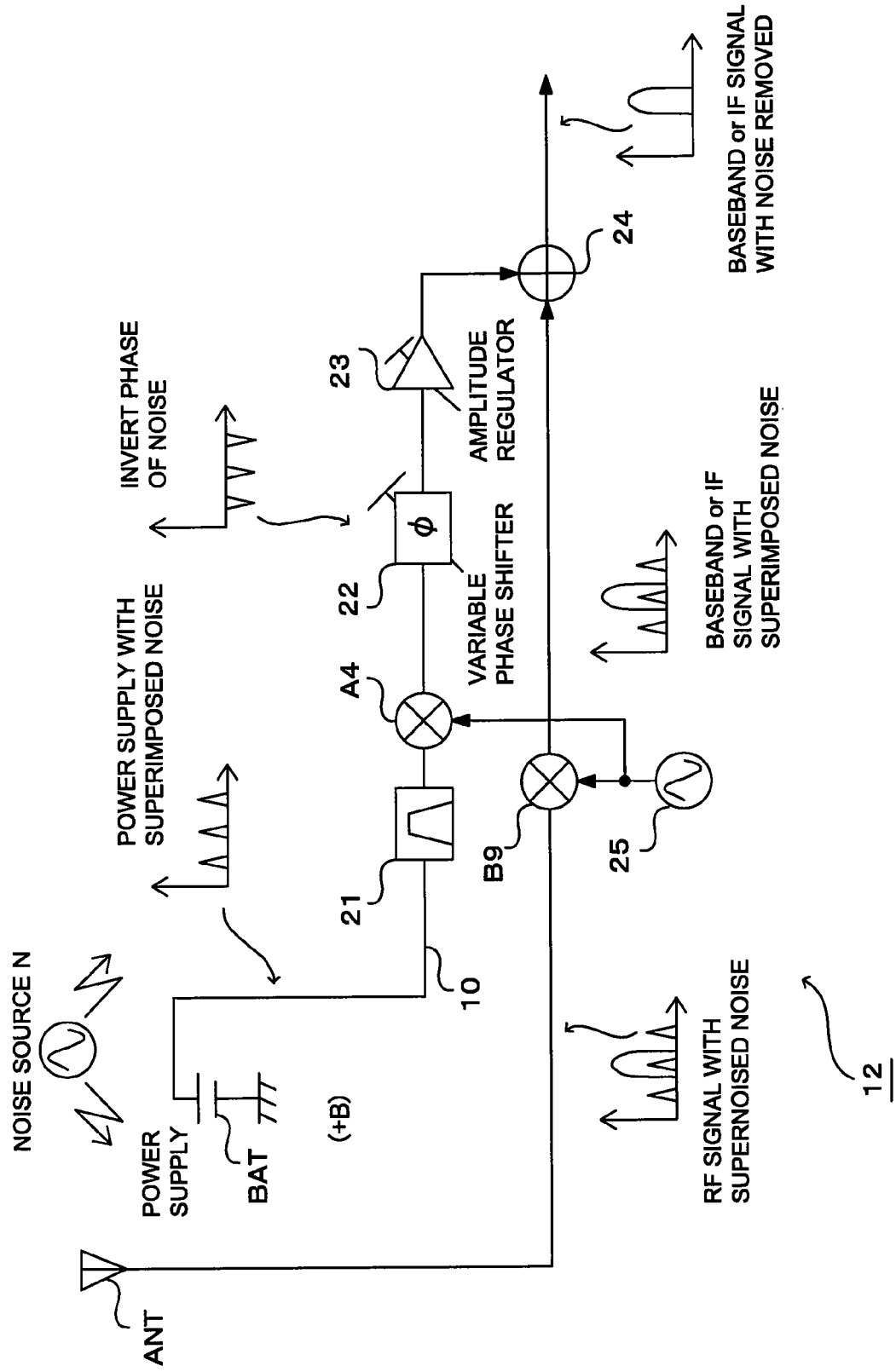
FIG. 2 is a block diagram of a noise canceller according to the first embodiment of the invention.

FIG. 1 is a block diagram of a radio reception device for vehicle according to a first embodiment of the invention.

In FIG. 1, a radio reception device for vehicle 100 is connected to a power supply BAT. Power for driving the radio reception device for vehicle 100 is supplied from the power supply BAT through a power line. The power supply of the embodiment is a battery provided on a vehicle on which radio reception device for vehicle 100 is mounted.

The radio reception device for vehicle 100 is also connectable to a speaker SP, and an output of the radio reception device for vehicle 100 is a sound output from the speaker SP. Instead of the speaker SP, a headphone or the like may be used to output the sound.

The radio reception device for vehicle 100 includes a power line 10, an RF amplification section 11, a noise canceller 12, an IF amplification section 13, a demodulation section 14, and a low frequency amplifier 15.

The RF amplification section 11 selects and amplifies broadcast signals input from an antenna ANT. The high frequency amplification stage, however, may be omitted in cases where input broadcast signals have a sufficient amplitude or in accordance with required specifications.

The noise canceller 12 includes a VCO and a mixer, and has an arrangement for converting a signal input from the RF amplification section into a signal of a certain low frequency regardless of the frequency of the input signal, and an arrangement for removing a noise superimposed on a broadcast signal through the antenna ANT as described in detail below.

The IF amplification section 13 is composed of a general circuitry for performing a function of amplifying a signal input to the IF amplification section 13 through the noise canceller 12 to a level at which the signal can be demodulated, a filtering function for removing an unwanted signal of an adjacent frequency, an automatic gain control function of stabilizing the input signal level into a demodulator by varying the amplification factor depending on the magnitude of the input signal, and other functions.

The demodulation section 14 is composed of a general circuitry including a demodulation function required for a communication system for reception.

The low frequency amplification section 15 is implemented by a general amplifier and power-amplifies an audio frequency signal output from the demodulation section 14 to a level at which the speaker SP can be driven.

The noise canceller 12 will now be described in detail with reference to FIG. 2. FIG. 2 is a block diagram illustrating a detailed configuration of the noise canceller 12 according to the embodiment.

The noise canceller 12 includes a power line (+B) 10 connected to the power supply BAT, a BPF 21 connected to the power line (+B) 10, a mixer A4 connected to the BPF 21, a variable phase shifter 22 connected to the mixer A4, and an amplitude regulator 23 connected to the variable phase shifter 22.

A broadcast signal is input to the antenna ANT. The noise canceller 12 includes a mixer B9 connected to the antenna ANT and an adder 24 connected to the mixer B9 and the amplitude regulator 23. The noise canceller 12 also includes a VCO 25 connected to the mixer A4 and the mixer B9.

A noise source N represents an emitter of electromagnetic noises, such as electrical equipment, for example a spark plug, which is a cause of an ignition noise generated in an engine. The BPF 21 is a band-limiting filter composed, for example, of a coil and a capacitor, and constitutes a block that only passes a radio broadcast frequency band.

The VCO 25 is a voltage-controlled oscillator that is composed of a variable capacitance diode that changes its capacitance value depending on an applied voltage, in addition to components such as a coil, a capacitor, and a transistor. The VCO 25 can change an oscillation frequency based on an applied voltage, and generates a local signal in a heterodyne receiver.

The mixer A4 is a multiplier and constitutes a block that multiplies the local signal generated by the VCO 25 by the noise component (such as an ignition noise) from the noise source N followed by addition or subtraction in a frequency domain to output an IF signal or a baseband signal. The mixer A4 is composed of components such as a diode or a transistor. The variable phase shifter 22 constitutes a block that rotates a phase of signal by means of a delay element or the like.

The amplitude regulator 23 is composed of a variable gain amplifier consisting of a transistor or the like, a variable attenuator consisting of a PIN diode or the like, or other components and constitutes a block that causes its output gain to vary. The antenna ANT is an antenna mounted on the vehicle.

The mixer B9 is a multiplier and constitutes a block that multiplies the local signal generated by the VCO 25 by the radio broadcast received at the antenna ANT followed by addition or subtraction in a frequency domain to output an IF signal or a baseband signal. The mixer B9 is composed of components such as a diode or a transistor.

The adder 24 constitutes a block that outputs a signal by adding the signal output by the amplitude regulator 23 to the signal output by the mixer B9, and is composed of a differential amplifier or the like.

Description will now be made to the processing by the radio reception device for vehicle 100 provided with the noise canceller 12 so configured as described above as well as a noise cancellation method thereof.

Noises generated from on-board electronics include an ignition noise generated in an engine, for example, and such a noise is more likely to intrude on the power line (+B) 10. Then, the power line (+B) 10 functions as an antenna to radiate the ignition noise, and the radiated noise enters the antenna ANT.

The noise component radiated by the power line (+B) 10 is reduced in its level by a transmission loss a, before arriving at the antenna ANT. This may be represented by ($\alpha$N). The noise component ($\alpha$N) arrived at the antenna ANT is superimposed on a radio broadcast wave (D). This may be represented by (D+$\alpha$N). The superimposed component (D+$\alpha$N) passes through a mixer where it is converted into an IF. The component may be represented by (Dif+$\alpha$Nif).

Meanwhile, a noise generated in the power line (+B) 10 is extracted by the BPF 21. The BPF 21 is a bandpass filter that passes a receiving band of a radio broadcast. The noise component passed through the BPF 21 may be represented by (N).

The noise component (N) interfering with the radio broadcast that has been extracted by the BPF 21 is converted into an IF by the mixer A4. The component may be represented by (Nif).

The phase of the noise (Nif) converted into an IF is inverted by 180 degrees by the variable phase shifter 22 (−Nif).

The noise (−Nif), the phase of which is inverted by 180 degrees, is regulated by the amplitude regulator 23 so as to have the same amplitude value a as that of the noise component intruding on the antenna (−$\alpha$Nif).

The IF (Dif+$\alpha$Nif) from the antenna and the IF (−$\alpha$Nif) from the power line (+B) 12 can be added together by the adder so that (Dif+$\alpha$Nif)+(−$\alpha$Nif)=Dif, which indicates that only the broadcast signal can be extracted.

In the description, $\alpha$ is a predetermined value for each vehicle on which the radio reception device for vehicle 100 is mounted, and is determined through examination while the device is actually mounted on a vehicle (such as CV) to find an optimum value to be the value of $\alpha$. Based on the $\alpha$, constants for circuitries and elements constituting the amplitude regulator 23 are set.

Since the amount of superimposed noises depends on the position of the antenna, the routing of a harness (such as the power line and a communication line) and the like, the same vehicle on which the radio reception device for vehicle 100 is mounted will have the same amount of superimposed noises on the antenna. An appropriate noise reduction can therefore be provided by determining the value of a in advance for each vehicle on which the radio reception device for vehicle 100 is mounted.

The phrase "for each vehicle" may have various meanings such as "for each type of vehicle", "for each structure of vehicle", or "for each arrangement of electrical equipment or wirings provided on a vehicle" and is intended to group any elements that contribute to noise radiation as one category.

In the embodiment, the value of a has been described as a fixed value determined in advance for each vehicle. While this is advantageous in that a fixed value of a leads to simplified control, the noise canceller function may also be realized by using a digital signal processor (DSP) or the like to detect noises and controlling the value of a to vary depending on detected results.

Furthermore, in the above description, a noise generated in the power line (+B) 10 is extracted by the BPF 21. If any other line such as a signal line is more susceptible to noises instead of the power line (+B), an arrangement may be possible, which extracts noises from such lines that suffer the intruding noises.

According to the embodiment as described above, "a block that converts a noise into an IF", "a variable phase shifter", "an amplitude regulator", and "an adder" are provided. As a result, only vehicle noises can be removed from a radio broadcast and annoying noises can be removed from vehicle electronics.

Additionally, sound distortion due to loss of sound information caused by the use of a limiter does not occur so that a quality sound with reduced distortion can be provided.

Note that although description has been made to a method for removing noises by IF conversion, the VCO 10 may only need to be adjusted to a broadcast frequency in the case of a baseband. In this case, the configuration does not need to be altered and therefore the detailed description will be omitted.

Second Embodiment

In the first embodiment of the invention as described above, the phase inversion and addition can similarly be performed on an RF signal instead of the IF or baseband to implement a noise reduction in a direct conversion receiver without the IF, in which case a mixer for converting a noise into the IF is eliminated and components can be reduced. This will be referred to as a second embodiment, which will now be described.

Figure 3:
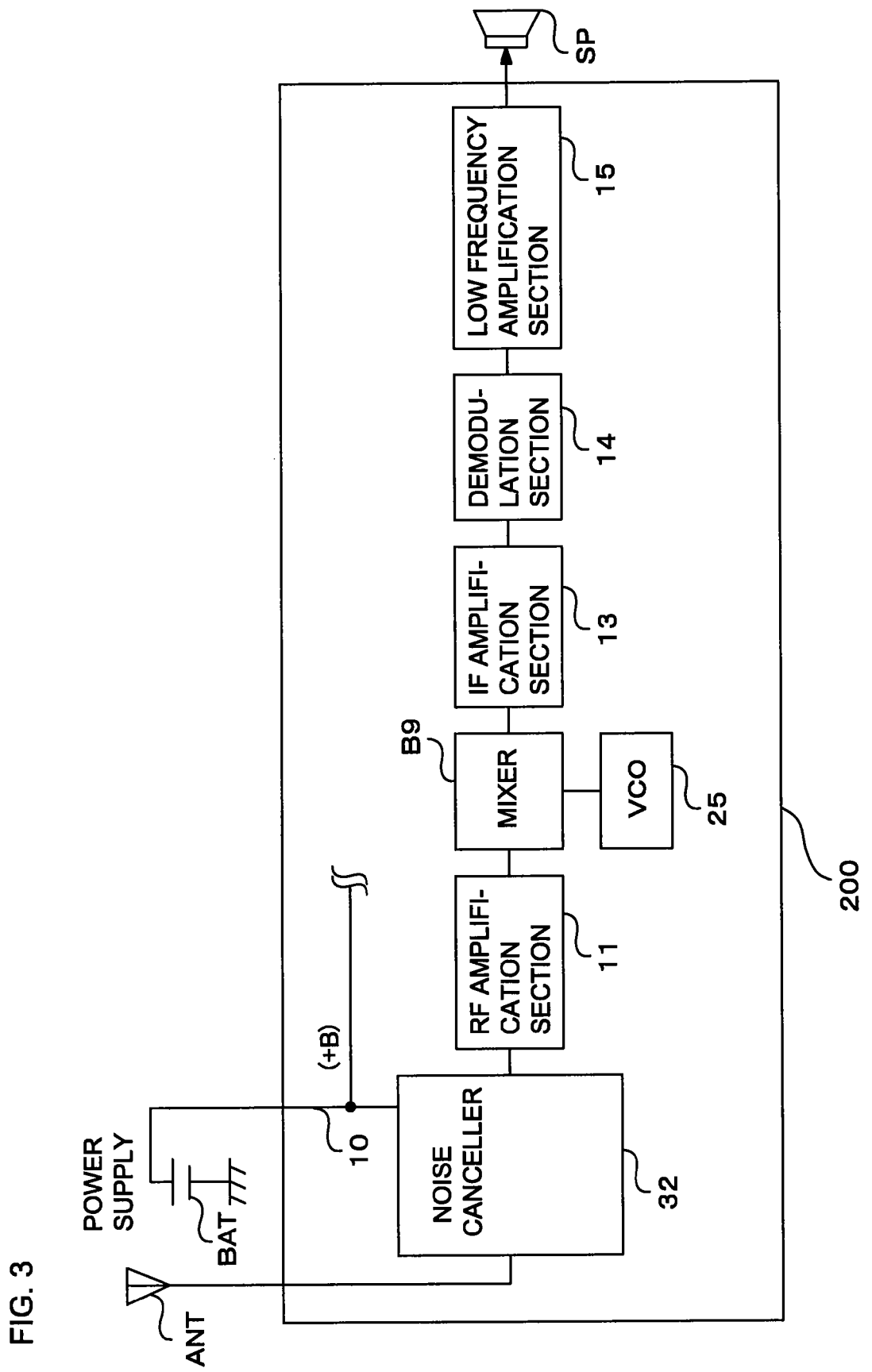
FIG. 3 is a block diagram of a radio reception device for vehicle according to a second embodiment of the invention.

FIG. 3 is a block diagram of a radio reception device for vehicle 200 according to a second embodiment of the invention.

In the embodiment, like reference numerals and characters denote similar components to those in the first embodiment, and detailed description thereof will be omitted.

A difference of the second embodiment from the first embodiment is that the noise canceller 32 is provided at a preceding stage to the RF amplification section 11.

In FIG. 3, the radio reception device for vehicle 200 is connected to the antenna ANT for receiving a radio broadcast wave (a broadcast signal), and the received broadcast signal is input to the RF amplification section 11 through the noise canceller 32 as described in detail below.

A signal output from the RF amplification section 11 is converted by the VCO 25 and the mixer B9 into a signal of a certain low frequency regardless of the frequency of the output signal. The subsequent signal processing is similar to that in the first embodiment and therefore the detailed description will be omitted.

The noise canceller 32 according to the embodiment will now be described in detail with reference to FIG. 4.

Figure 4:
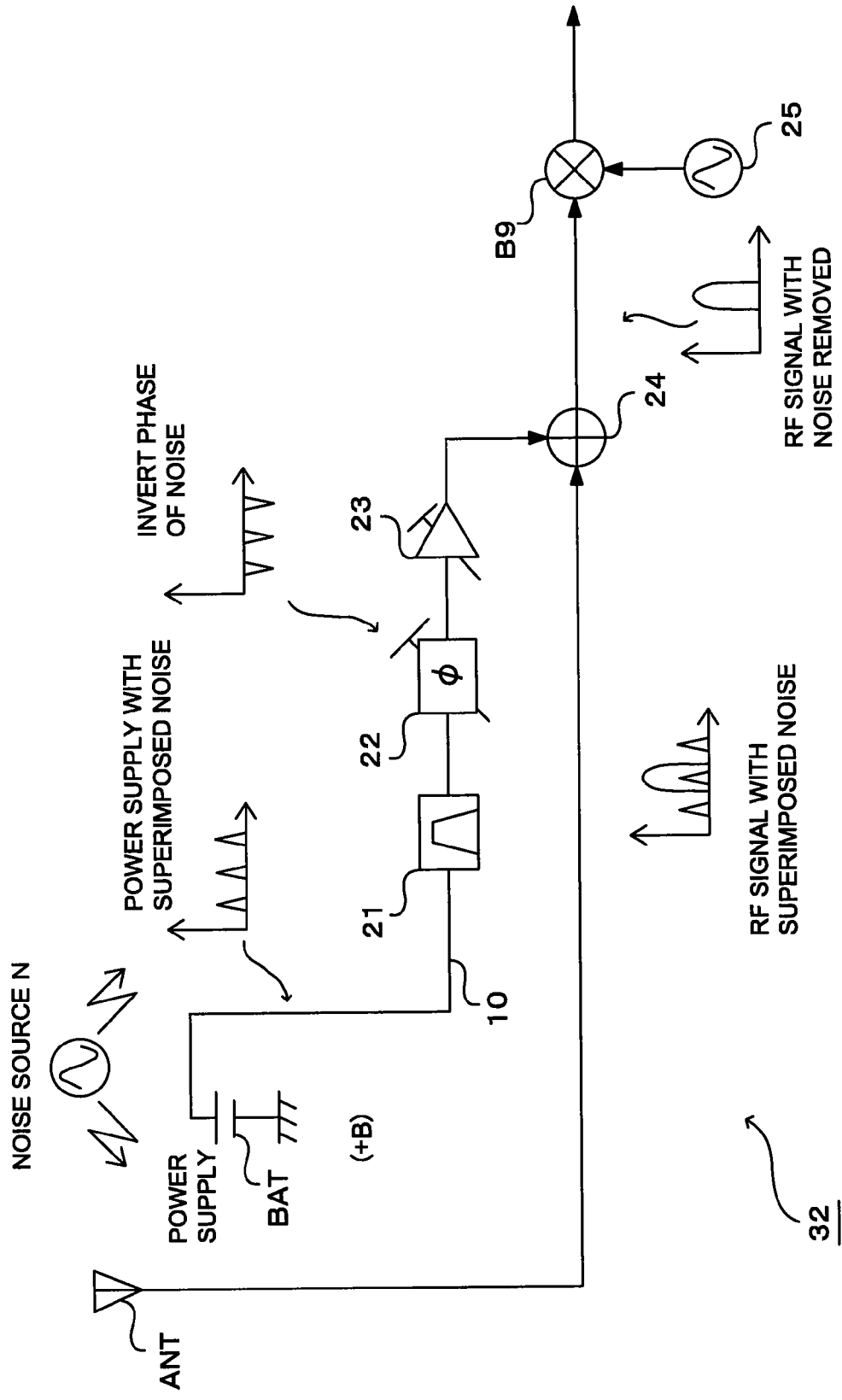
FIG. 4 is a block diagram of a noise canceller according to the second embodiment of the invention.
Figure 5:
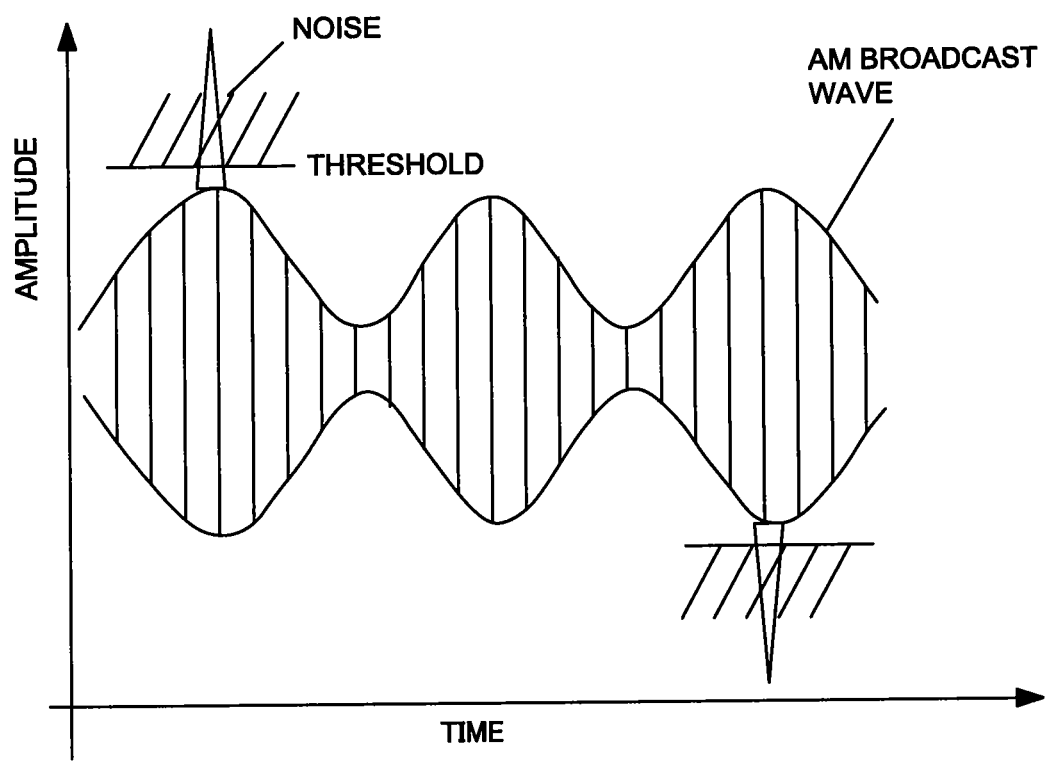
FIG. 5 illustrates a waveform from conventional noise canceling with a lower threshold.
Figure 6:
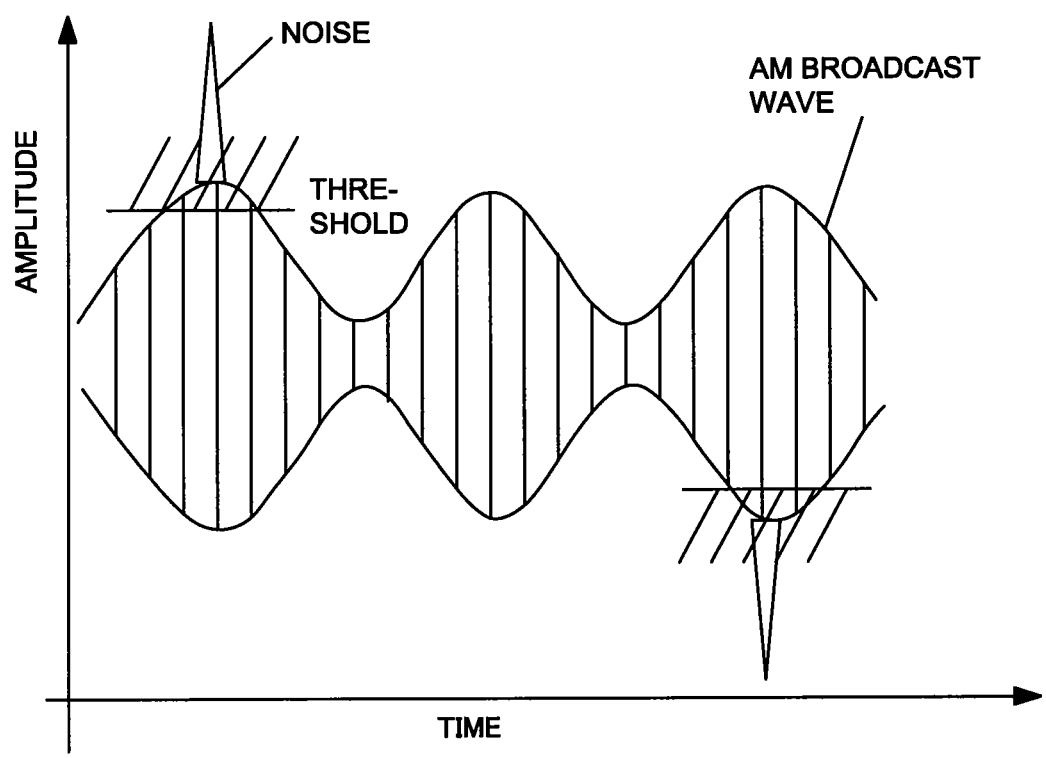
FIG. 6 illustrates a waveform from conventional noise canceling.

FIG. 4 is a block diagram illustrating a detailed configuration of the noise canceller 32 according to the embodiment.

In FIG. 4, noise canceller 32 includes a power line (+B) 10 connected to the power supply BAT, a BPF 21 connected to the power line (+B) 10, a variable phase shifter 22 connected to the BPF 21, and an amplitude regulator 23 connected to the variable phase shifter 22.

A noise source N represents an emitter of electromagnetic noises, such as electrical equipment, for example a spark plug, which is a cause of an ignition noise generated in an engine.

The BPF 21 is a band-limiting filter composed, for example, of a coil and a capacitor, and constitutes a block that only passes a radio broadcast frequency band.

The VCO 25 is a voltage-controlled oscillator that is composed of a variable capacitance diode that changes its capacitance value depending on an applied voltage, in addition to components such as a coil, a capacitor, and a transistor. The VCO 25 can change an oscillation frequency based on an applied voltage, and generates a local signal in a heterodyne receiver.

The variable phase shifter 22 constitutes a block that rotates a phase of signal by means of a delay element or the like.

The amplitude regulator 23 is composed of a variable gain amplifier consisting of a transistor or the like, a variable attenuator consisting of a PIN diode or the like, or other components and constitutes a block that causes its output gain to vary. The antenna ANT is an antenna mounted on the vehicle.

The mixer B9 is a multiplier and constitutes a block that multiplies the local signal generated by the VCO 25 by the radio broadcast received at the antenna ANT followed by addition or subtraction in a frequency domain to output an IF signal or a baseband signal. The mixer B9 is composed of components such as a diode or a transistor.

The adder 24 constitutes a block that outputs a signal by adding the signal output by the amplitude regulator 23 to the signal output by the antenna ANT, and is composed of a differential amplifier or the like.

The processing by the radio reception device for vehicle 200 provided with the noise canceller 32 so configured as described above will now be described as well as a noise cancellation method thereof.

Noises generated from on-board electronics, for example an ignition noise generated in an engine is more likely to intrude on the power line (+B) 10. The power line (+B) 10 serves as an antenna to radiate the ignition noise, which enters the radio antenna.

The noise component radiated by the power line (+B) 10 is reduced in its level by a transmission loss a, before arriving at the antenna ANT. This may be represented by ($\alpha$N). The noise component ($\alpha$N) arrived at the antenna ANT is superimposed on a radio broadcast wave (D). This may be represented by (D+$\alpha$N).

Meanwhile, a noise generated in the power line (+B) 10 is extracted by the BPF 21. The BPF 21 is a bandpass filter that passes a receiving band of a radio broadcast. The noise component passed through the BPF 21 may be represented by (N).

The phase of the noise component (N) interfering with the radio broadcast that has been extracted by the BPF 21 is inverted by 180 degrees by the variable phase shifter 22 (-N).

The noise (-N), the phase of which is inverted by 180 degrees, is regulated by the amplitude regulator 23 so as to have the same amplitude value a as that of the noise component intruding on the antenna (-$\alpha$N).

The IF (D+$\alpha$N) from the antenna and the IF (-$\alpha$N) from the power line (+B) 10 can be added together by the adder so that (D+$\alpha$N)+(-$\alpha$N)=D, which indicates that only the broadcast signal can be extracted, where a is the same as that described in the first embodiment.

Similarly to the first embodiment, in the above description, a noise generated in the power line (+B) 10 is extracted by the BPF 21. If any other line such as a signal line is more susceptible to noises instead of the power line (+B), an arrangement may be possible, which extracts noises from such lines that suffer the intruding noises.

According to the embodiment as described above, "a variable phase shifter", "an amplitude regulator", and "an adder" are provided. In other words, an arrangement is provided, in which a signal of an RF, IF, or baseband stage of a radio receiver mixed with a noise is added to a phase-inverted component of the noise to remove only the noise. As a result, only noises can be removed from a radio sound and annoying noises can be removed from vehicle electronics. Additionally, sound distortion due to loss of sound information caused by the use of a limiter does not occur so that a quality sound with reduced distortion can be provided.

Although preferred embodiments of the present invention conceivable at this time have been described, it will be appreciated that various modifications may be made to the embodiments and the attached claims are intended to encompass all such modifications that fall within the scope and true spirit of the invention.

INDUSTRIAL APPLICABILITY

The present invention is useful for an on-board radio, particularly for a radio reception device for vehicle so as to remove noises generated from on-board electronics.

REFERENCE SIGNS LIST

10 Power line
11 RF amplification section
12, 32 Noise canceller
21 Bandpass filter
22 Variable phase shifter
23 Amplitude regulator
24 Adder
25 VCO (voltage-controlled oscillator)
A4, B9 Mixer
100, 200 Radio reception device for vehicle

The invention claimed is:

1. A radio reception device for vehicle connected to an antenna, comprising:
    an oscillator;
    a first mixer that outputs a signal generated by mixing an output signal from the oscillator with a broadcast signal received by the antenna;
    an internal line on which a noise is intruding;
    a filter that is electrically connected to the internal line by a signal line and extracts the noise intruding on the internal line through the electrical connection;
    a second mixer that outputs a signal generated by mixing the noise extracted by the filter with the output signal from the oscillator;
    a variable phase shifter that outputs a signal generated by inverting a phase of the signal output from the second mixer by 180 degrees;
    an amplitude regulator that outputs a signal generated by regulating an amplitude of the signal output from the variable phase shifter; and
    an adder that outputs a signal generated by adding the signal output from the amplitude regulator to the signal from the first mixer.

2. The radio reception device according to claim 1, wherein the internal line is a power line.

3. The radio reception device according to the claim 1, wherein the first mixer outputs a baseband signal or an IF signal generated by mixing an output signal from the oscillator with a broadcast signal received by the antenna, and the second mixer outputs a baseband signal or an IF signal generated by mixing the noise extracted by the filter with the output signal from the oscillator.

4. A radio reception device for vehicle connected to an antenna, comprising:
- an internal line on which a noise is intruding;
- a filter that is electrically connected to the internal line by a signal line and extracts the noise intruding on the internal line through the electrical connection;
- a variable phase shifter that outputs a signal generated by inverting a phase of the noise extracted by the filter by 180 degrees;
- an amplitude regulator that outputs a signal generated by regulating an amplitude of the noise output from the variable phase shifter; and
- an adder that outputs a signal generated by adding a broadcast signal received by an antenna to the signal output from the amplitude regulator.

5. The radio reception device according to claim 4, wherein the internal line is a power line.

6. A noise cancellation method applied to a radio reception device for vehicle connected to an antenna, comprising:
- outputting, by a first mixer, a signal generated by mixing an output signal from an oscillator with a broadcast signal received by the antenna;
- extracting, by a filter, a noise intruding on an internal line on the device through an electrical connection between the filter and the internal line;
- outputting, by a second mixer, a signal generated by mixing the noise extracted by the filter with the output signal from the oscillator;
- outputting, by a variable phase shifter, a signal generated by inverting a phase of the signal output from the second mixer by 180 degrees;
- outputting, by an amplitude regulator, a signal generated by regulating an amplitude of the signal output from the variable phase shifter; and
- outputting, by an adder, a signal generated by adding the signal output from the amplitude regulator to the signal from the first mixer.

7. The noise cancellation method according to claim 6, wherein the internal line is a power line.

8. The noise cancellation method according to the claim 6, wherein the first mixer outputs a baseband signal or an IF signal generated by mixing an output signal from the oscillator with a broadcast signal received by the antenna, and the second mixer outputs a baseband signal or an IF signal generated by mixing the noise extracted by the filter with the output signal from the oscillator.

9. A noise cancellation method applied to a radio reception device for vehicle connected to an antenna, comprising:
- extracting, by a filter, a noise intruding on an internal line on the device through an electrical connection between the filter and the internal line;
- outputting, by a variable phase shifter, a signal generated by inverting a phase of the noise extracted by the filter by 180 degrees;
- outputting, by an amplitude regulator, a signal generated by regulating an amplitude of the noise output from the variable phase shifter; and
- outputting, by an adder, a signal generated by adding a broadcast signal received by the antenna to the signal output from the amplitude regulator.

10. The noise cancellation method according to claim 9, wherein the internal line is a power line.

* * * * *